(12) United States Patent
Iizuka et al.

(10) Patent No.: US 9,285,519 B2
(45) Date of Patent: *Mar. 15, 2016

(54) OPTICAL DEVICE USING LATERALLY-SHIFTABLE DIFFRACTION GRATINGS

(75) Inventors: Hideo Iizuka, Ann Arbor, MI (US); Nader Engheta, Berwyn, PA (US)

(73) Assignees: Toyota Motor Engineering & Manufacturing North America, Inc., Erlanger, KY (US); The Trustess of the University of Pennsylvania, Philadelphia, PA (US)

( * ) Notice: Subject to any disclaimer, the term of this patent is extended or adjusted under 35 U.S.C. 154(b) by 1138 days.

This patent is subject to a terminal disclaimer.

(21) Appl. No.: 13/309,834

(22) Filed: Dec. 2, 2011

(65) Prior Publication Data

US 2012/0075703 A1 Mar. 29, 2012

Related U.S. Application Data

(63) Continuation of application No. 12/692,688, filed on Jan. 25, 2010, now Pat. No. 8,072,684.

(51) Int. Cl.
*G02B 5/18* (2006.01)
*G02B 6/35* (2006.01)

(52) U.S. Cl.
CPC .............. *G02B 5/1866* (2013.01); *G02B 6/351* (2013.01)

(58) Field of Classification Search
None
See application file for complete search history.

(56) References Cited

U.S. PATENT DOCUMENTS

| 4,331,972 | A | 5/1982 | Rajchman |
| 4,402,610 | A | 9/1983 | Lacombat |
| 4,729,640 | A | 3/1988 | Sakata |
| 4,781,442 | A | 11/1988 | Koster et al. |
| 5,430,561 | A | 7/1995 | Kato et al. |
| 5,434,434 | A | 7/1995 | Kasahara et al. |
| 5,477,351 | A | 12/1995 | Takahara et al. |
| 5,915,051 | A | 6/1999 | Damask et al. |
| 6,295,402 | B1 | 9/2001 | Nakamura et al. |
| 6,643,424 | B2 | 11/2003 | Jacobowitz et al. |
| 6,721,473 | B1 | 4/2004 | Islam et al. |
| 6,858,462 | B2 | 2/2005 | Zaidi et al. |
| 6,885,789 | B2 | 4/2005 | Liu |
| 7,187,837 | B2 | 3/2007 | Gothoskar et al. |

(Continued)

FOREIGN PATENT DOCUMENTS

JP 2009-134232 A 6/2009

OTHER PUBLICATIONS

Brundett, D. L., Glytsis, E. N., and Gaylord, T. K., "Normal Incidence Guided Mode Resonant Grating Filters: Design and Experimental Demonstration", Opt. Lett. 23, 700 (1998).

(Continued)

*Primary Examiner* — Arnel C Lavarias
(74) *Attorney, Agent, or Firm* — Christopher G. Darrow; Darrow Mustafa PC

(57) ABSTRACT

A double-sided grating divider acts as a light switch where the upper and lower grating dividers are arranged to accommodate a relative lateral shift therebetween of about one-fourth of the period of the diffraction grating elements and where the critical refraction angles of the grating dividers are more than about 43.6°. Lateral shift may be achieved by various devices including MEMS and metal couplers having a known/calibrated thermal coefficient of expansion over a temperature range of interest.

20 Claims, 4 Drawing Sheets

(56) References Cited

U.S. PATENT DOCUMENTS

| | | |
|---|---|---|
| 7,263,260 B2 | 8/2007 | Singh et al. |
| 8,072,684 B2 * | 12/2011 | Iizuka et al. .................. 359/576 |
| 8,687,277 B2 * | 4/2014 | Johnson ........................ 359/566 |
| 8,976,450 B2 * | 3/2015 | Iizuka et al. .................. 359/573 |
| 2005/0237617 A1 * | 10/2005 | Carr et al. ..................... 359/569 |

OTHER PUBLICATIONS

Perry. T. S., "Tomorrow's TV—the grating light valve", IEEE Spectrum 41, 38 (2004).

* cited by examiner

OPTICAL DEVICE USING LATERALLY-SHIFTABLE DIFFRACTION GRATINGS

CROSS-REFERENCE TO RELATED APPLICATION

This application is a continuation of the co-pending U.S. patent application Ser. No. 12/692,688 filed Jan. 25, 2010.

FIELD OF THE INVENTION

This invention relates to diffraction grating dividers and more particularly to an optical device comprising a double-sided grating divider made up of mutually inverted optical grating elements which can be shifted laterally relative to one another to modulate the degree to which light is transmitted therethrough.

BACKGROUND OF THE INVENTION

It is known that diffraction-based grating dividers can be constructed using materials of different refraction indices and certain critical geometries. For example, a grating divider may comprise a periodic pattern of geometrically regular ridges and grooves in a substrate of fused $SiO_2$. The ridges and grooves exhibit geometric characteristics including a period "p", a height "h" of the ridges, and a fill factor "r" which is the ratio of the width of the ridges to the period. Through selection of these parameters, it is possible to determine the degree to which light of various orders are transmitted and/or are trapped within the substrate. For example, a grating having a diffraction angle in excess of the 43.6° critical angle for the $SiO_2$/air interface will trap±first order diffraction component light. Details of a relevant grating divider can be found in the co-pending application Ser. No. 12/638,334 filed Dec. 15, 2009 and assigned to the assignees of this application, the entire content of which is incorporated herein by reference.

SUMMARY OF THE INVENTION

The present invention provides a variable transmittance optical system using two mutually inverted diffraction grating structures which can be shifted laterally relative to one another to control the degree to which light energy in a selected wavelength band is transmitted therethrough. In general, this is accomplished by arranging two diffraction grating structures of identical optical characteristics in mutually inverted series relationships separated by a liquid medium so that the gratings can be shifted laterally relative to one another. The shift is on the order of a fraction of one grating period and can be provided by, for example, piezoelectric or microelectromechanical systems (MEMS) to shift the optical system between a high transmittance state and a low transmittance state.

The phenomenon of the present invention can be used to practical advantage in a number of ways including the modulation or switching of laser light as well as the control of the transmissivity of the unpolarized sunlight through, for example, a window or skylight.

In one preferred form hereinafter described in detail, the grating dividers comprise geometrically regularly distributed grating elements of a first material such as $TiO_2$ immersed in air and mounted on a substrate of a second material such as fused $SiO_2$ wherein the geometries; i.e., the p, h and r values, of the grating dividers are such as to produce a diffraction angle of greater than about 43.6°.

When arranged in a mutually inverted spaced-apart relationship in such a way as to allow a lateral shift between two grating dividers, the degree to which normal incident light in the visible range is transmitted through the grating dividers can be switched from less than about 5% to more than about 95%. The invention, therefore, can be implemented in various ways to act as a light valve or regulator. The immersion substance need not be air but can be solid, liquid or gas substances the refraction indices of which with the $TiO_2$ interface are known.

As hereinafter discussed in detail, the variation in alignment may be singular; i.e., one of the grating dividers may be fixed while the other is permitted to shift laterally. Alternatively, it may be mutual or bilateral in that both grating dividers are arranged and/or mounted so as to be laterally shiftable, but in opposite directions.

The mechanisms for providing the lateral shift may vary considerably. In one practical arrangement the grating dividers or multiples thereof may be mounted strategically on structures which carry other structures or patterns, the degree of alignment between which is critical. In another arrangement, the shifting mechanisms may be in the form of piezoelectric devices or microelectromechanical systems (MEMS). In a still further embodiment, the shift producing elements may be devices with predetermined and precisely known coefficients of thermal expansion such that the degree of lateral alignment between the grating dividers and the consequential degree of visible light transmissivity therethrough varies as a function of temperature.

The invention and the various embodiments and applications thereof may be best understood from a reading of the following specification which is to be taken with the accompanying drawings.

BRIEF SUMMARY OF THE DRAWINGS

The description herein makes reference to the accompanying drawings wherein like reference numerals refer to like parts throughout the several views and wherein.

DETAILED DESCRIPTION OF THE ILLUSTRATIVE EMBODIMENTS

Figure 1:
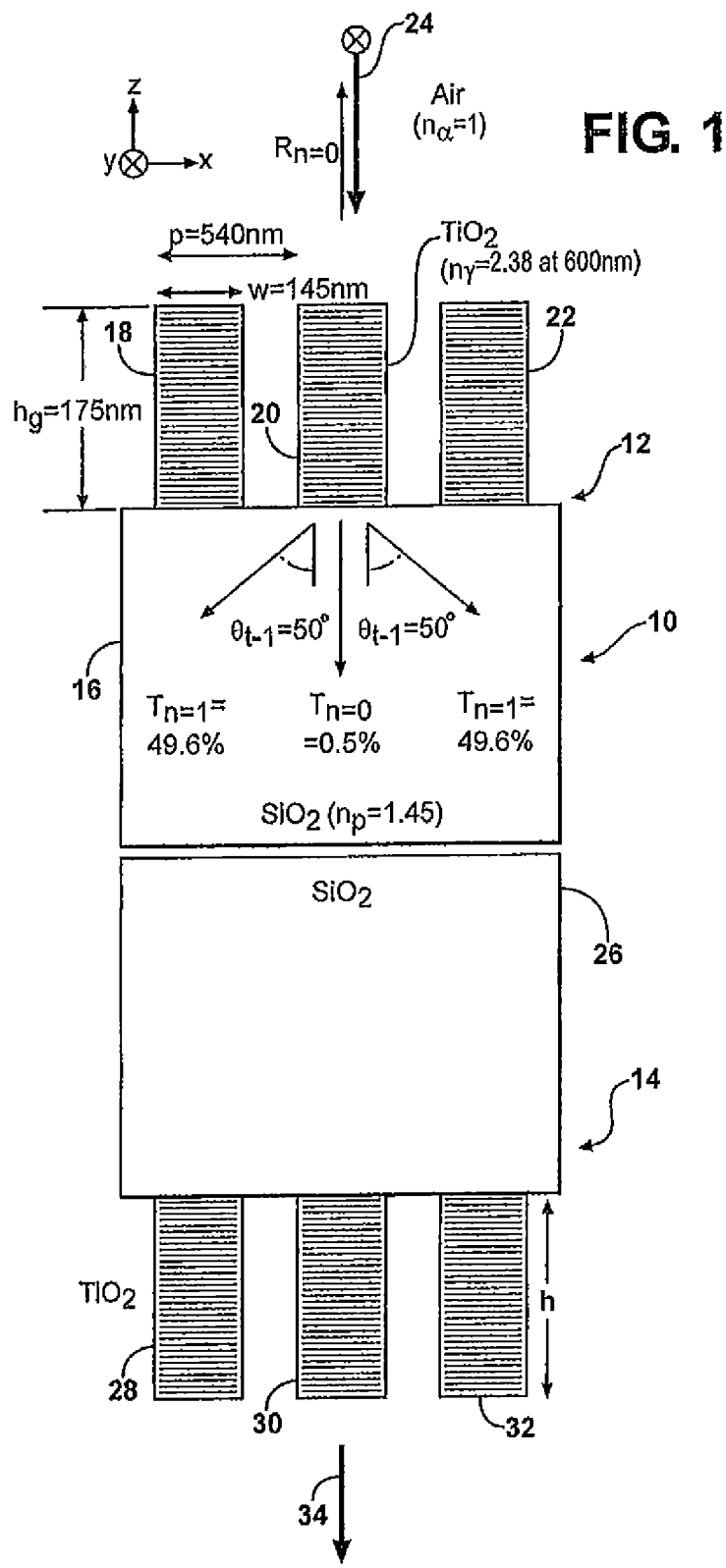
FIG. 1 is a diagram of a double-sided diffraction grating divider employing the principles of the present invention with the grating elements of the dividers in lateral alignment so as to fully couple the $0^{th}$ order incident light component therethrough.

Referring to FIG. 1, there is shown a double-sided device 10 comprising mutually inverted and laterally aligned diffraction grating dividers 12, 14. Grating divider 12 comprises a substrate 16 of fused $SiO_2$ on which identical diffraction grating elements 18, 20, 22 made of $TiO_2$ are fused or mounted to the top surface of the substrate 16 in a regular periodic fashion so as to exhibit a period p of 540 nm, a height h of 175 nm and a width of 145 nm. The elements 18, 20, 22 are immersed in this case in air to create an air/$TiO_2$ interface. Other surrounding media, including solid substances, can also be used. The fill factor r=0.27 can be determined by dividing the width w by the period p. The geometry is selected so as to produce a refraction angle in excess of the 43.6° critical angle of the $TiO_2$ air interface. In a practical embodiment, the period p may be in the range of about 0.87 to about $0.93\lambda$, where $\lambda$ is the wavelength of the incident light 24, the fill factor r is in the range of about 0.22 to about 0.32 and h is in the range of about 0.24 to $0.34\lambda$. As shown in FIG. 1, with these values, the first order refraction components are diffracted by an angle of approximately 50°, well above the critical angle.

The lower diffraction grating divider 14 comprises a substrate 26 of $SiO_2$ and periodically arranged $TiO_2$ grating elements 28, 30, 32 also immersed in air and having the exact same geometry as the grating elements 18, 20, 22. In other words, grating divider 14 is identical to grating divider 12 but is inverted. In the example of FIG. 1, light 24 may be thought as the input or incident light whereas light 34 is the output light which is transmitted through; i.e., the output light component when the transmittance or transmissivity of the device 10 is operating at the "on" level hereinafter described.

Figure 2:
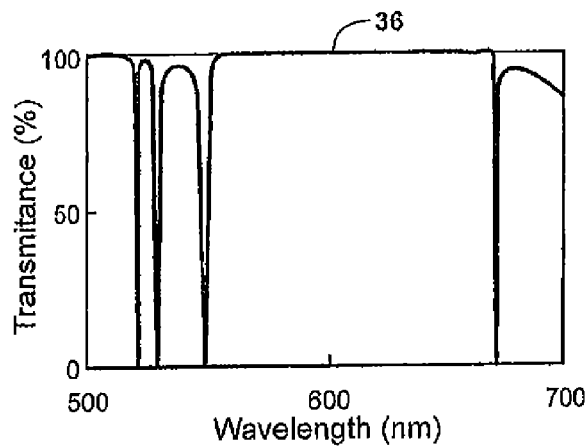
FIG. 2 is a graph of light wavelength vs. transmittance for the device of FIG. 1 in the aligned condition illustrated in FIG. 1.

FIG. 2 is a graphical illustration of the degree of the transmittance of the $0^{th}$ order of the s-polarized incident light 24 when the diffraction grating elements 18, 20, 22 of the upper diffraction grating divider 12 are fully laterally aligned with the grating elements 28, 30, 32 of the lower diffraction grating divider 14. The s-polarized light has the electric field in the y axis. Between about 550 nm and about 670 nm; i.e., in the "on" zone 36, the transmittance is in excess of 95%.

Figure 3:
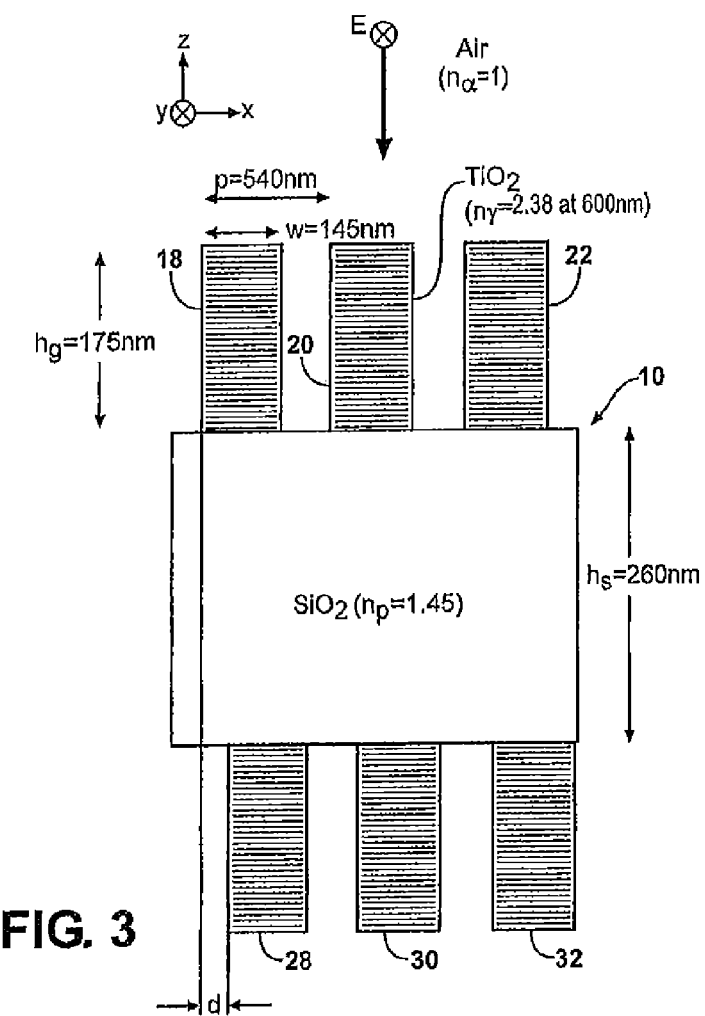
FIG. 3 is a diagrammatic illustration of a double-sided grating divider but with the grating elements shifted by a distance d.
Figure 4:
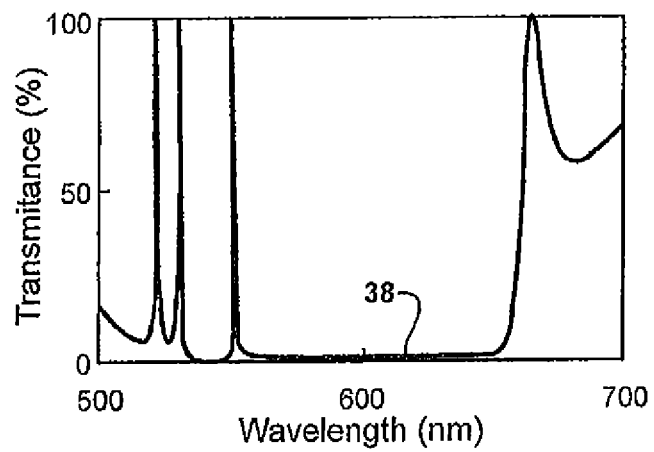
FIG. 4 is a graph of wavelength vs. transmittance for the double-sided grating divider of FIG. 3 in the shifted or non-aligned condition.

Looking now to FIG. 3, the double-sided grating divider device 10 is shown in the "off" condition wherein the lower grating elements 28, 30, 32 are shifted by a distance d relative to the upper grating elements 18, 20, 22 wherein d is approximately p/4. FIG. 4 shows that the transmittance of the $0^{th}$ order component of normal incident unpolarized light in the wavelength range between about 550 and 650 nm is in the "off" zone 38 wherein the transmittance is near 0; i.e., less than about 5%.

Figure 5:
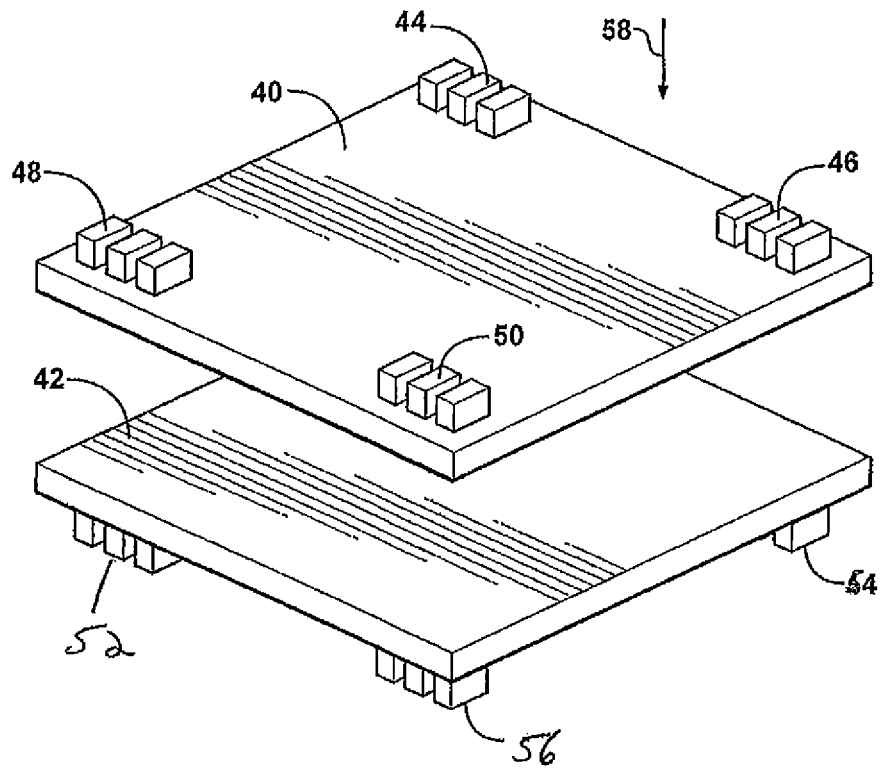
FIG. 5 is a perspective view of an alignment marker for a multi-layer fabrication process utilizing the principles and physical implementations of the present invention.

Referring to FIG. 5, there is shown a first practical application of the phenomenon of the present invention in an alignment marker for a $SiO_2$ multi-layer fabrication process. This device comprises an upper planar substrate 40 and, in spaced parallel relationship therewith a lower $SiO_2$ substrate 42. The upper substrate 40 carries $TiO_2$ grating elements 44, 46, 48, 50 in the four corners thereof arranged essentially in the fashion illustrated in FIGS. 1 and 3. The lower $SiO_2$ substrate 42 carries diffraction grating elements 52, 54, 56 and a fourth diffraction grating divider in the upper left hand corner as viewed in FIG. 5 which is obscured by the drawing. The diffraction grating elements 48, 52, for example, are arranged to be essentially in alignment with one another when the substrates 40, 42 are properly aligned but will be shifted relative to one another when the substrates are non-aligned along a lateral axis passing through and between the substrates 40, 42. A similar alignment situation exists for the grating elements 50, 56 and for the grating elements 46, 54 as well as the grating elements in the upper left hand corners which only the upper grating element 44 is visible.

Light 58 from a laser is directed normally toward the upper substrate 40 in such a way that when the grating elements are laterally aligned so as to exhibit the on condition represented by FIG. 2, the $0^{th}$ order incident light component passes or is transmitted substantially fully through to a detector 60 to show the aligned condition. Conversely, when the substrates 40, 42 are not aligned, indicating an alignment error in the fabrication process, substantially no light from the laser 58 reaches the detector and the fabrication process is thereafter terminated or paused to make suitable alignment adjustments. Similar alignment detection can be achieved for the orthogonal axis.

Figure 6:
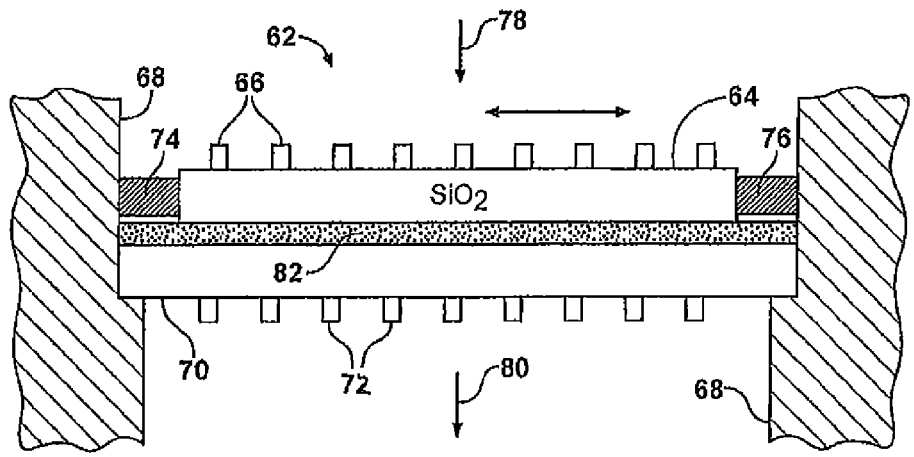
FIG. 6 is a cross-sectional view of an optical switch using MEMS to shift the upper diffraction grating divider of the two inverted diffraction grating dividers relative to the lower diffraction grating divider wherein a liquid crystal layer serves as a fluid interface between the two diffraction grating dividers.

Referring now to FIG. 6, there is shown an optical device in the form of an incident light valve or switch 62 comprising the combination of a planar upper $SiO_2$ substrate 64 carrying periodically arranged $TiO_2$ diffraction grating elements 66 and, in spaced parallel relationship thereto, a lower planar $SiO_2$ substrate with $TiO_2$ diffraction grating elements 72. The lower substrate 70 is fixed in a frame 68 whereas the upper substrate 64 is sandwiched between micro electromechanical systems (MEMS) devices 74, 76 so that the substrate 64 can be shifted relative to the lower substrate 70 to align and/or shift the diffraction grating elements 66, 72 to act as a valve whereby the incident light 78 is switched between a low transmissivity condition wherein the output light 80 is essentially 0 and a high transmissivity wherein the output light component 80 is nearly 100%. The lateral shifting of the substrates 64, 70 is facilitated by means of a liquid crystal layer 82 which lies in the space between the inverted substrates 64, 70 and has a refraction index of approximately 1.6. This layer can be replaced by an air layer with a refractive index of 1.

Figure 7:
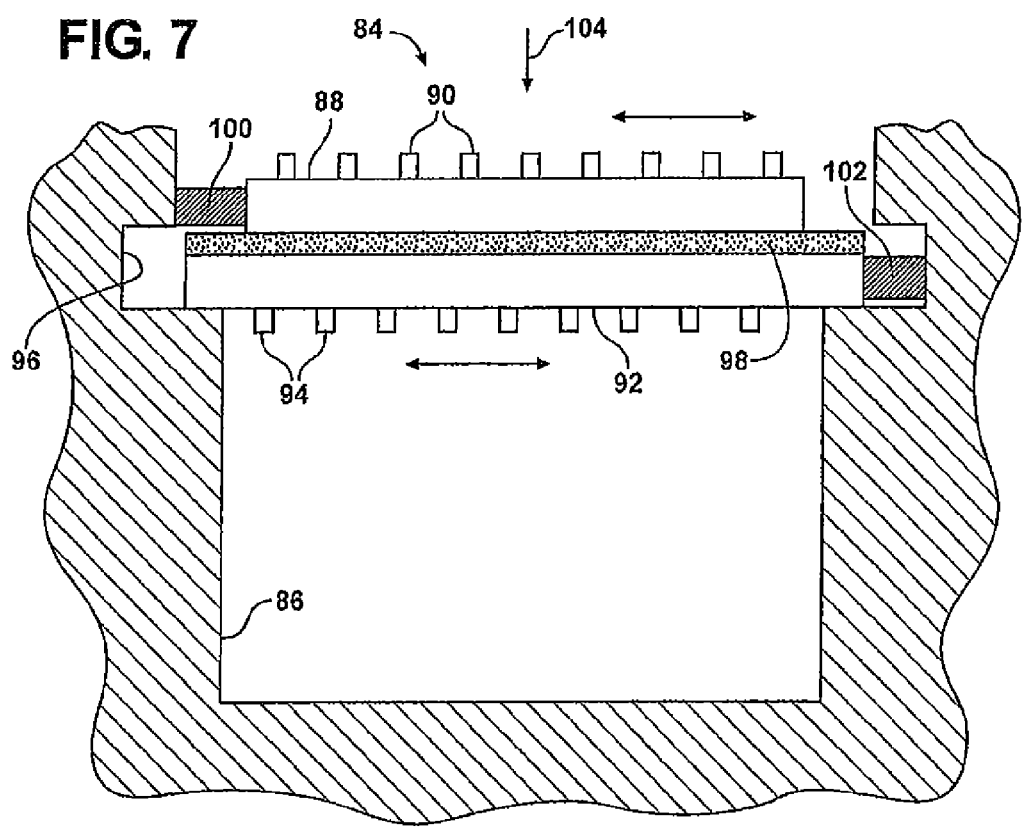
FIG. 7 is a diagrammatic illustration of a second application of the present invention in a switch for unpolarized sunlight in which the lateral movement or shift of the grating dividers in the double-sided grating assembly is accomplished by means of metals with known and calibrated coefficients of thermal expansion.

Referring to FIG. 7, there is shown a temperature sensitive skylight 84 for a room 86. The skylight 84 comprises an upper planar $SiO_2$ substrate 88 having periodically spaced diffraction grating elements 90 mounted to the upper surface thereof and exposed to incident sunlight 104. The thermally responsive skylight 84 further comprises a lower planar $SiO_2$ substrate 92 having diffraction grating elements 94 regularly arranged thereon in the fashion described above with respect to FIGS. 1 and 3. The two substrates 88, 92 are separated by a liquid crystal layer 98 which is suitably contained and which acts as an optically transparent bearing between the two substrates 88, 92 just as the layer 82 acts in the embodiment of FIG. 6.

Between a frame 96 and the left side of the substrate 88 is a metal element 100 having a known coefficient of thermal expansion which responds to temperature changes to cause a lateral shift in the position of the substrate 88 relative to the adjacent frame 96. Similarly, a second element 102 is mounted between the frame 96 and the right edge of the substrate 92 so as to cause a shift in the lateral shift in that substrate and the grating elements 94 in response to ambient temperature changes. The two shifts created by the metal elements 100, 102 are cumulative and, when properly calibrated to achieve a shift of one-quarter of the period of the gratings 90, 94 over the temperature range of interest, can produce a valving or switching function wherein the incident sunlight 104 is fully transmitted into the room 86 under low temperature conditions but is essentially fully blocked when ambient temperature becomes high. The embodiment of FIG. 7 can be used with additional sputter-deposited filters for selected wavelengths.

It is to be understood that the invention has been described with reference to specific materials and specific practical applications and that these descriptions are illustrative rather than limiting. For a definition of the invention reference should be taken to the accompanying claims.

What is claimed is:

1. An optical device responsive to incident light having a component of wavelength, $\lambda$, the optical device comprising:
   first and second substantially identical diffraction grating dividers each having a distributed plurality of grating elements having a predetermined, regular geometry and being formed of a first material contacting a medium and disposed at a surface of a substrate;
   said first and second diffraction grating dividers being arranged in mutually inverted but spaced apart and substantially aligned relationship; and
   means for varying lateral alignment of the first and second diffraction grating dividers relative to one another to vary a degree to which incident light is transmitted therethrough,
   wherein the first material has a refractive index greater than a refractive index of the substrate, and the refractive index of the substrate is greater than a refractive index of the medium, at wavelength, $\lambda$.

2. An optical device as defined in claim 1 wherein the medium is air.

3. An optical device as defined in claim 1 wherein the first and second grating dividers are spaced apart by a volume of liquid crystal.

4. An optical device as defined in claim 1 wherein the grating elements are made of $TiO_2$.

5. The optical device as defined in claim 1, wherein each of the first and second diffraction grating dividers is defined by successive ridges and grooves having a periodicity p, a height, h, and a fill factor, r, wherein p is within a range of about $0.87\lambda$ to $0.93\lambda$, r is within a range of about 0.22 to 0.32, and h is within a range of about $0.24\lambda$ to $0.34\lambda$.

6. A light valve responsive to incident light having a component of wavelength, $\lambda$, the light valve comprising:
   first and second substantially identical diffraction grating dividers each made up of a distributed plurality of grating elements disposed at a surface of a substrate, the grating elements having predetermined, regular geometries and formed of a first material, the grating elements and substrate contacting a medium, an interface of the substrate and the medium having a critical angle, wherein the diffraction grating dividers diffract the component of light with a diffraction angle that exceeds the critical angle;
   said first and second diffraction grating dividers being arranged in mutually inverted relationship; a side of the first diffraction grating divider providing an input to incident light, and a side of the second diffraction grating divider providing an output to transmitted light; and
   the grating elements of the first and second diffraction grating dividers being arranged to permit variations in lateral alignment which variations vary transmission of light through the light valve;
   wherein the first material has a refractive index greater than a refractive index of the substrate, and the refractive index of the substrate is greater than a refractive index of the medium, at wavelength, $\lambda$.

7. A light valve as defined in claim 6 wherein the medium is air.

8. A light valve as defined in claim 6 further including a volume of liquid crystal between the first and second diffraction grating dividers.

9. A light valve as defined in claim 6 wherein the grating elements are formed of $TiO_2$.

10. A light valve as defined in claim 6 further including at least one microelectromechanical system to shift at least one grating divider laterally.

11. A light valve as defined in claim 6 further including a thermal expansion device associated with at least one divider whereby the variation in lateral alignment is a function of temperature.

12. The light valve as defined in claim 6, wherein each of the first and second diffraction grating dividers is defined by successive ridges and grooves having a periodicity p, a height, h, and a fill factor, r, wherein p is within a range of about $0.87\lambda$ to $0.93\lambda$, r is within a range of about 0.22 to 0.32, and h is within a range of about $0.24\lambda$ to $0.34\lambda$.

13. A window that is variably transmissive toward a component of incident light having wavelength, $\lambda$, the window comprising:
   first and second diffraction grating dividers each made up of a distributed plurality of grating elements disposed at a surface of a substrate, the grating elements having regular geometries and formed of a first material, the grating elements and substrate contacting a medium, an interface of the substrate and the medium having a critical angle, wherein the diffraction grating dividers diffract the component of light with a diffraction angle that exceeds the critical angle;
   said first and second diffraction grating dividers being arranged in mutually inverted, substantially laterally aligned, spaced-apart relationship with an interface substance having a refractive index of about 1 therebetween;
   a first side of the first diffraction grating divider providing an input surface to incident light, a first side of the second diffraction grating divider providing an output surface for light transmissively diffracted by the first diffraction grating divider; and
   means for varying lateral alignment between the elements of first and second grating dividers thereby to vary transmission of the component of incident light through the window;
   wherein the first material has a refractive index greater than a refractive index of the substrate, and the refractive index of the substrate is greater than a refractive index of the medium, at wavelength, $\lambda$.

14. A variably light-transmissive window as defined in claim 13 wherein the dividers have a boundary with air.

15. A variably light-transmissive window as defined in claim 13 wherein the substance is liquid crystal.

16. A variably light-transmissive window as defined in claim 13 wherein the grating elements are formed of $TiO_2$.

17. A variable light-transmissive window as defined in claim 13 wherein the means for varying comprises at least one microelectromechanical system.

18. A variable light-transmissive window as defined in claim 13 wherein the means comprises a thermal expansion device whereby variation in lateral alignment is a function of temperature.

19. The window as defined in claim 14, wherein each of the first and second grating dividers is defined by successive ridges and grooves having a periodicity p, a height, h, and a fill factor, r, wherein p is within a range of about $0.87\lambda$ to $0.93\lambda$, r is within a range of about 0.22 to 0.32, and h is within a range of about $0.24\lambda$ to $0.34\lambda$.

20. A light valve responsive to a component of incident light having wavelength, $\lambda$, the light valve comprising:
- first and second diffraction gratings, each having periodic grating elements with a first refractive index toward the component of incident light disposed at a surface of a substrate having a second refractive index toward the component of incident light;
- a liquid medium;
- said first and second diffraction gratings being arranged in opposed and aligned relationship with said liquid medium therebetween; and
- means for changing alignment between said first and second diffraction gratings thereby to vary transmission of incident polarized light through the valve,
- wherein the first refractive index is greater than the second refractive index.

* * * * *